May 31, 1932. W. B. FAGEOL 1,861,001
MOTOR COACH
Filed Oct. 18, 1929 10 Sheets-Sheet 1

Inventor
W. B. Fageol
By Strauch & Hoffman
Attorneys

May 31, 1932. W. B. FAGEOL 1,861,001
MOTOR COACH
Filed Oct. 18, 1929   10 Sheets-Sheet 2
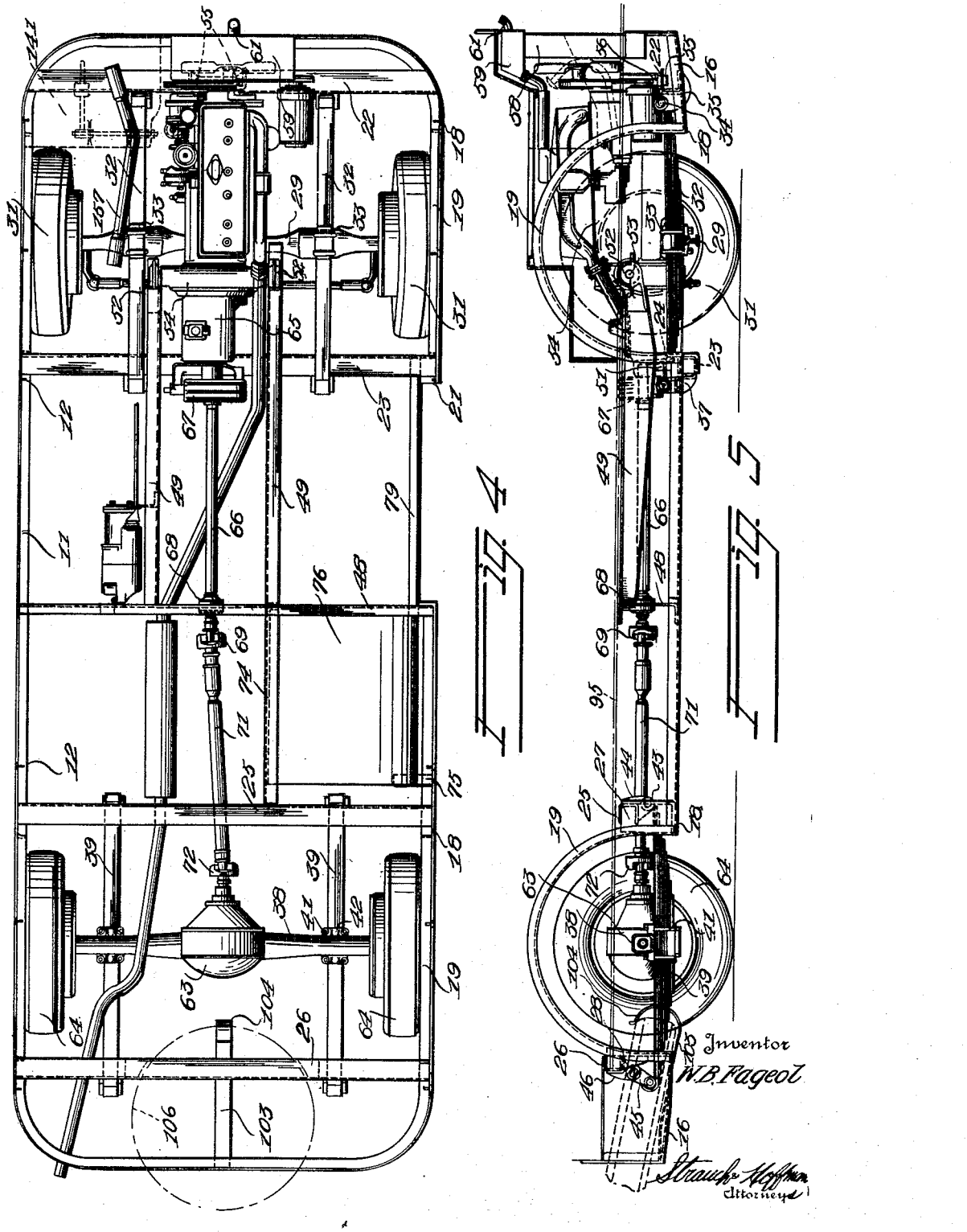

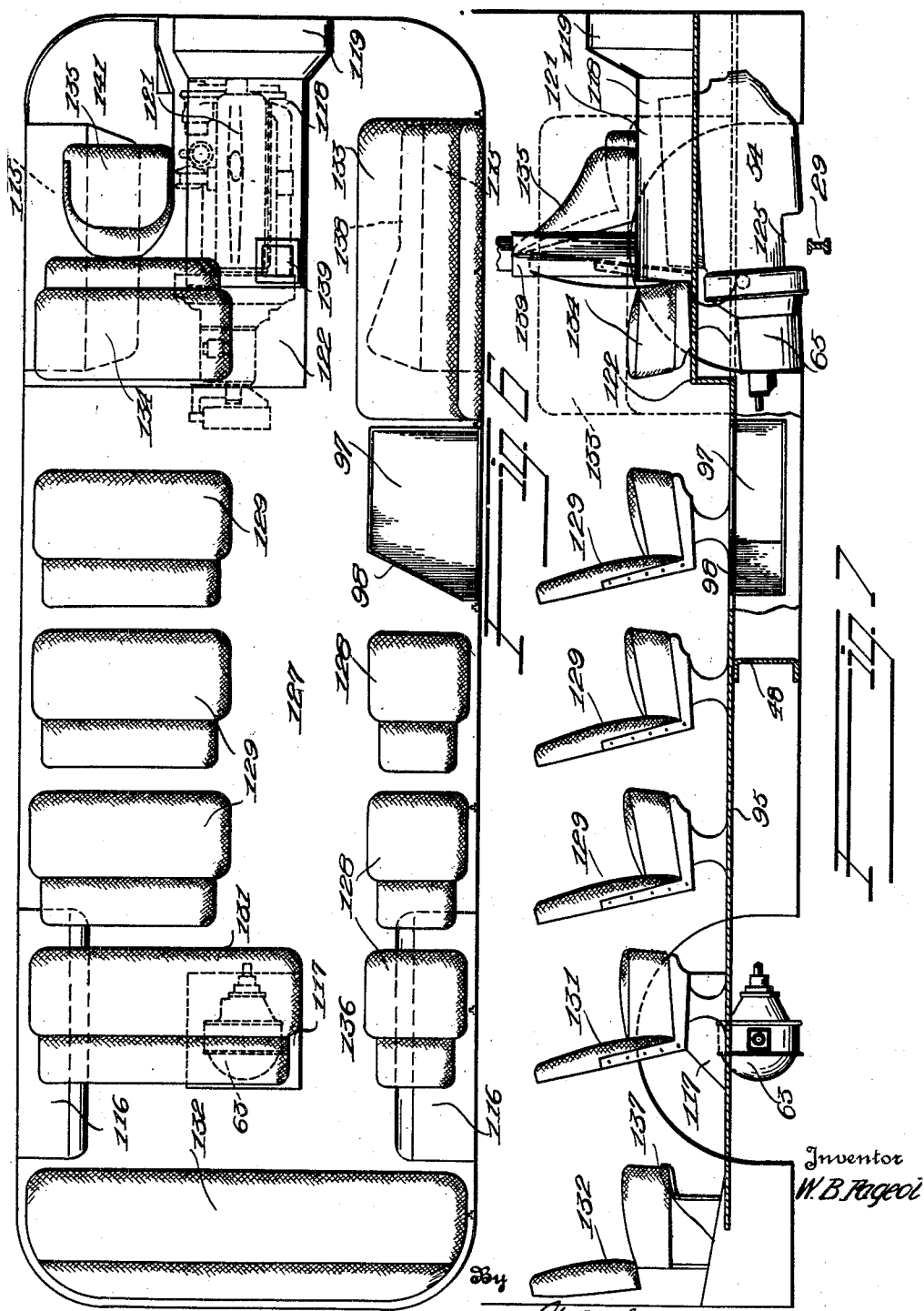

May 31, 1932.   W. B. FAGEOL   1,861,001
MOTOR COACH
Filed Oct. 18, 1929   10 Sheets-Sheet 4
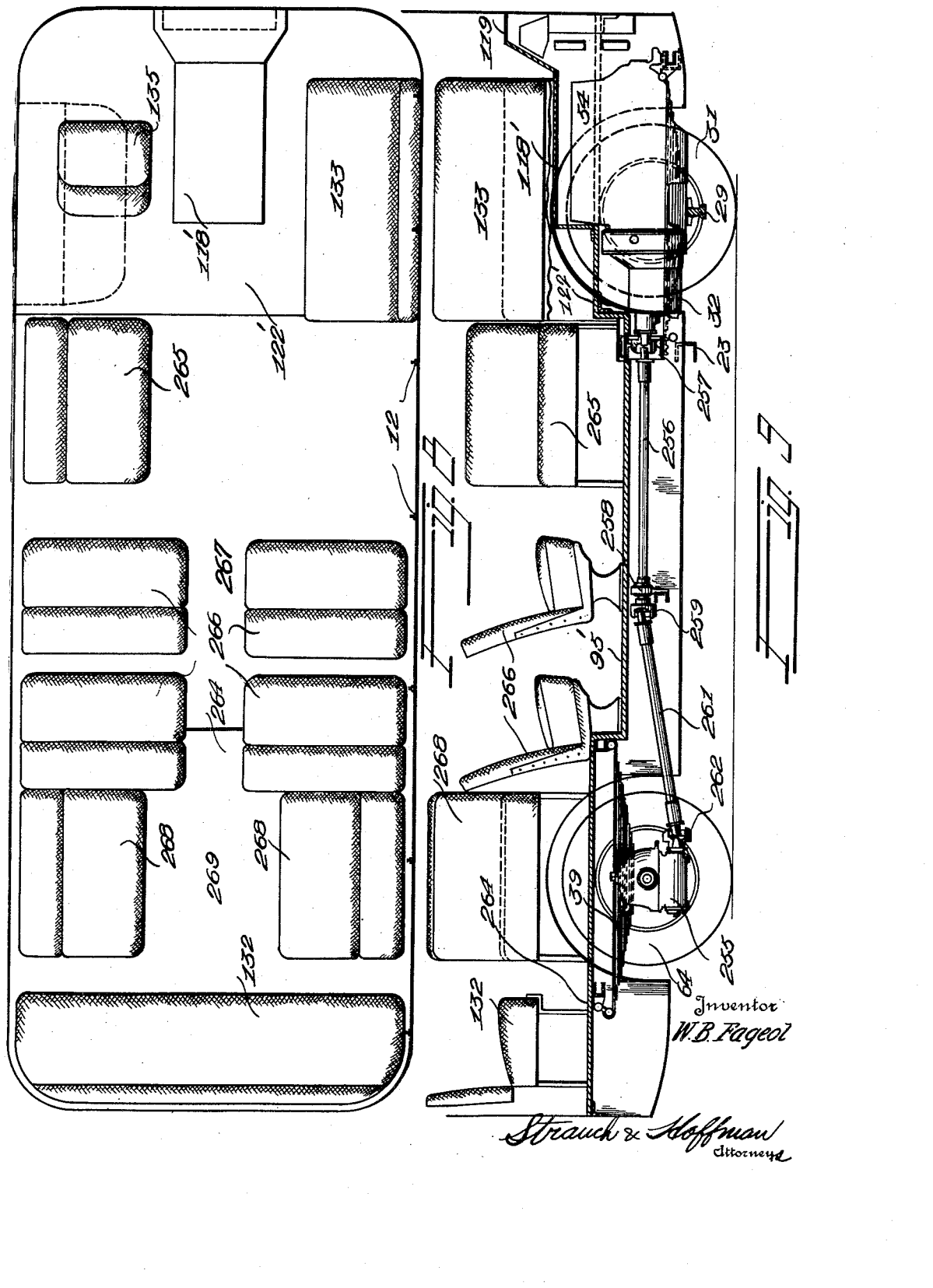

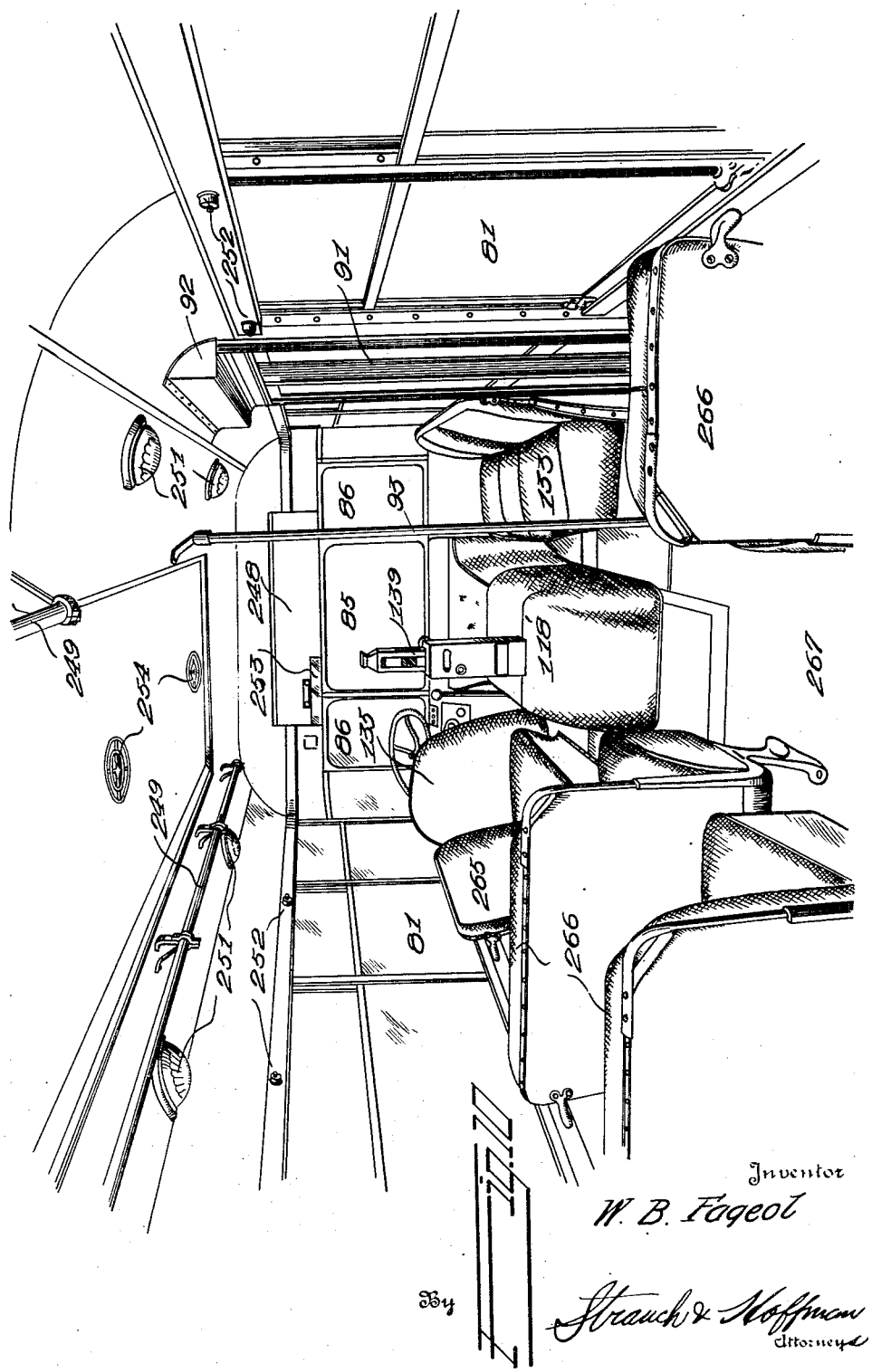

May 31, 1932.    W. B. FAGEOL    1,861,001
MOTOR COACH
Filed Oct. 18, 1929    10 Sheets-Sheet 6
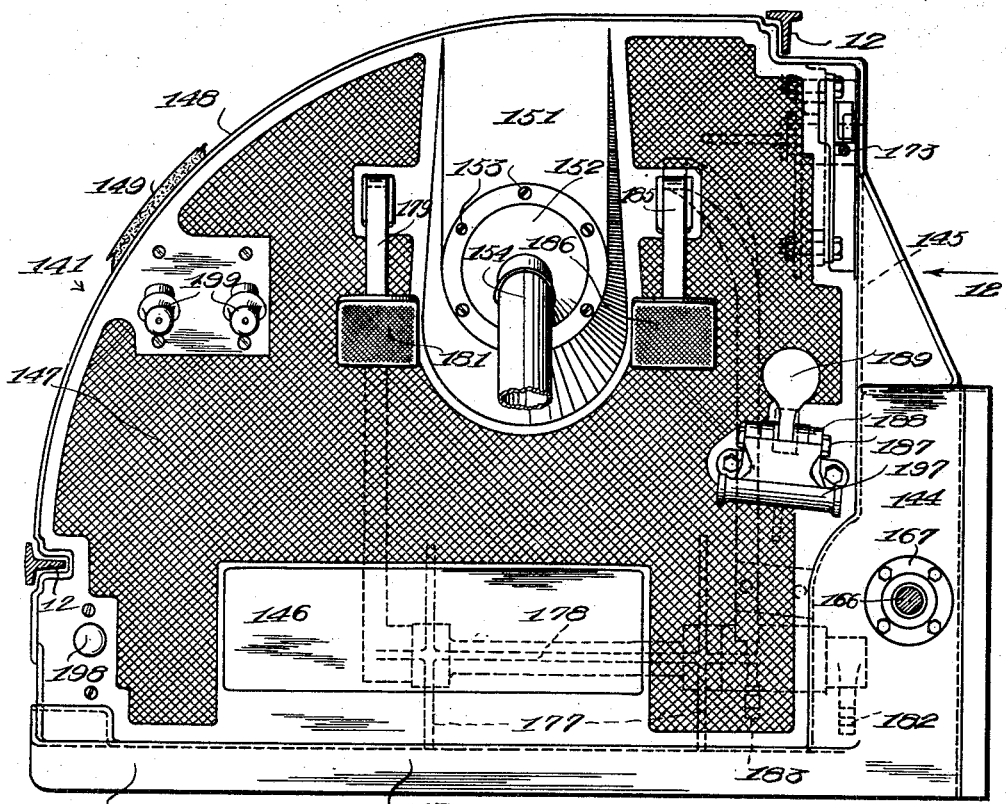
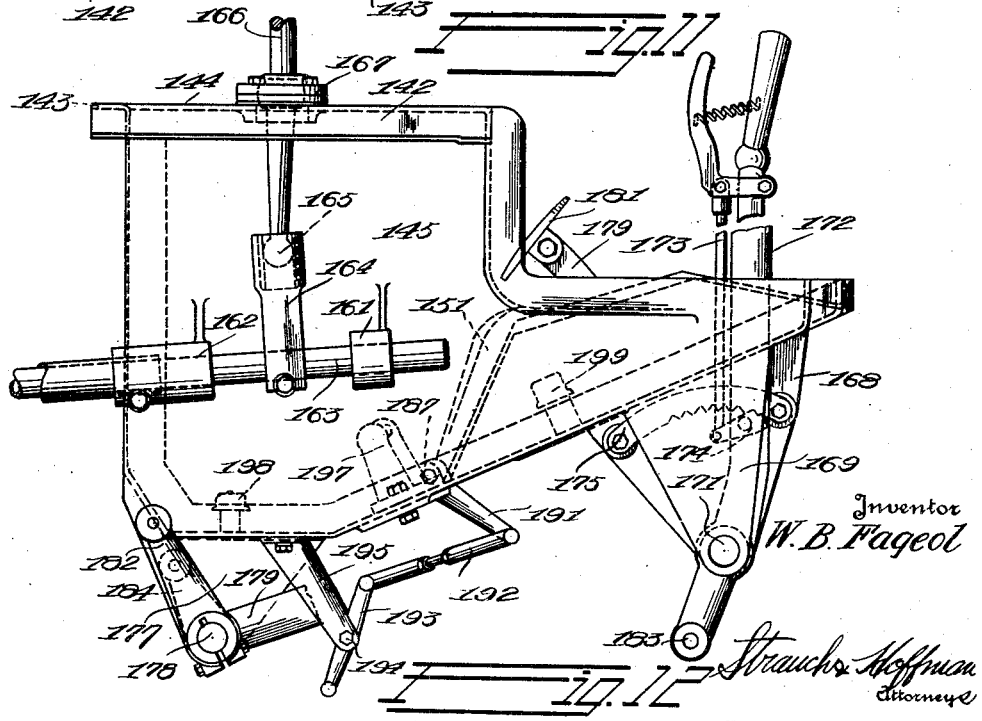
Inventor
W. B. Fageol
Strauch & Hoffman
Attorneys May 31, 1932.  W. B. FAGEOL  1,861,001
MOTOR COACH
Filed Oct. 18, 1929   10 Sheets-Sheet 7
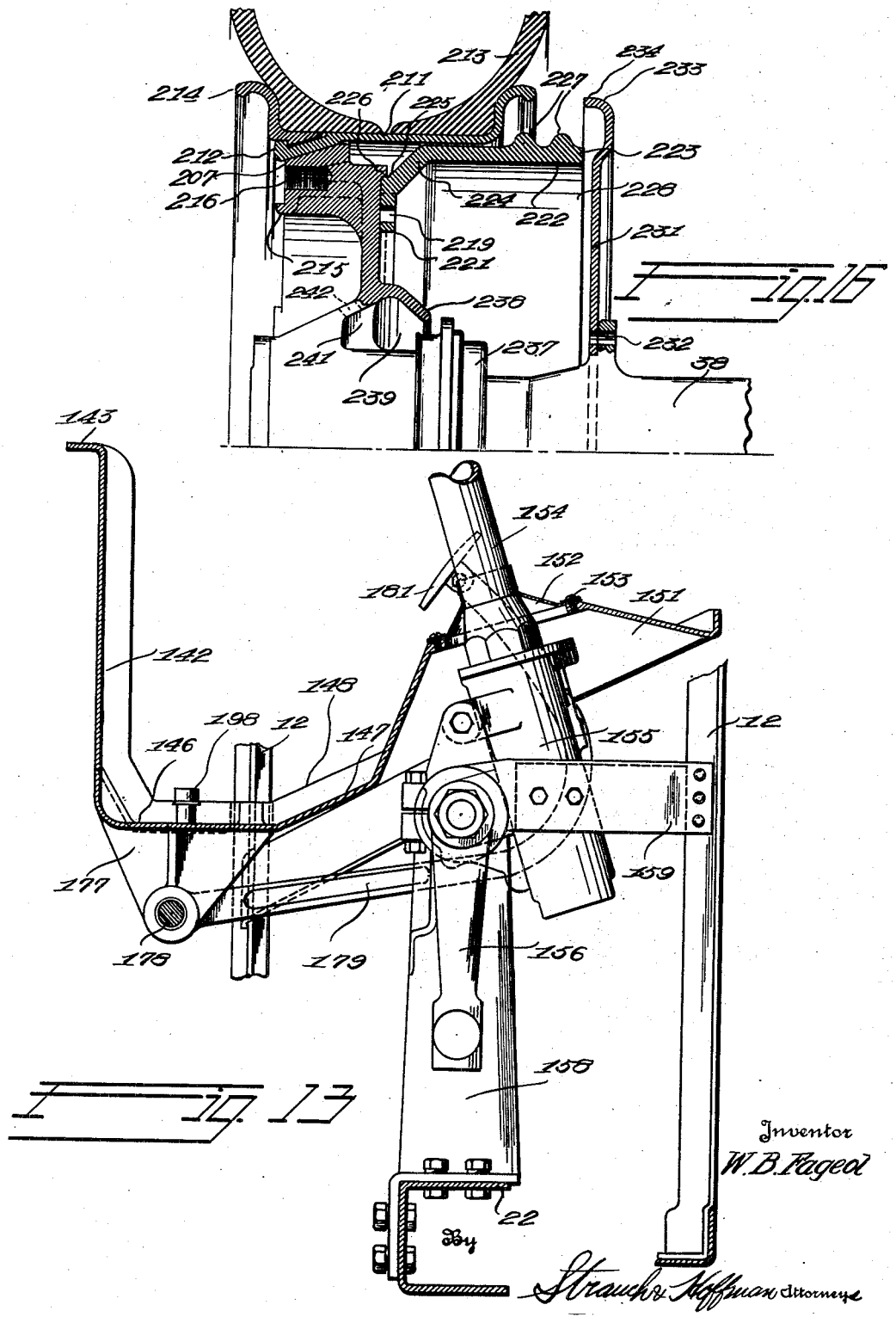

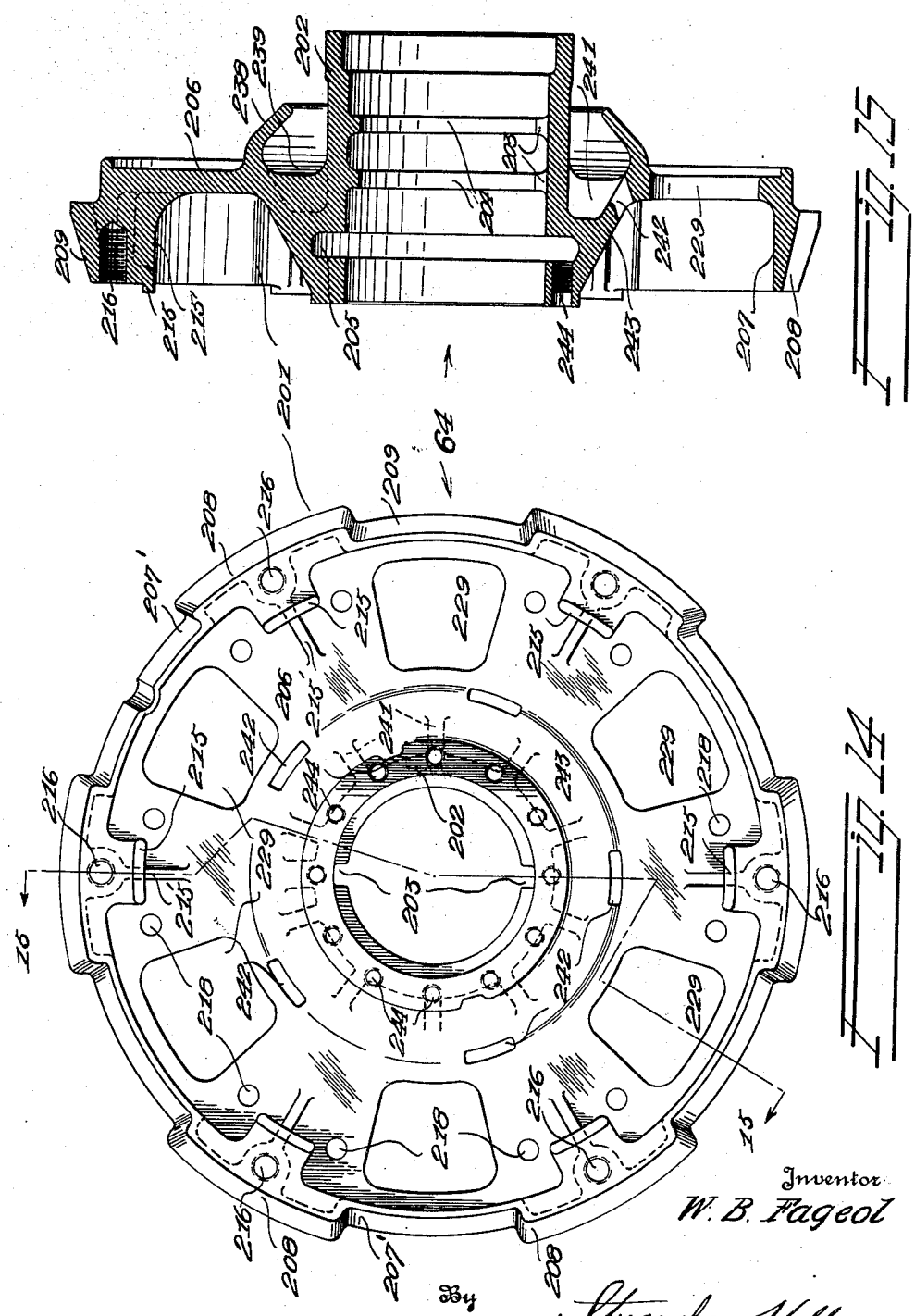

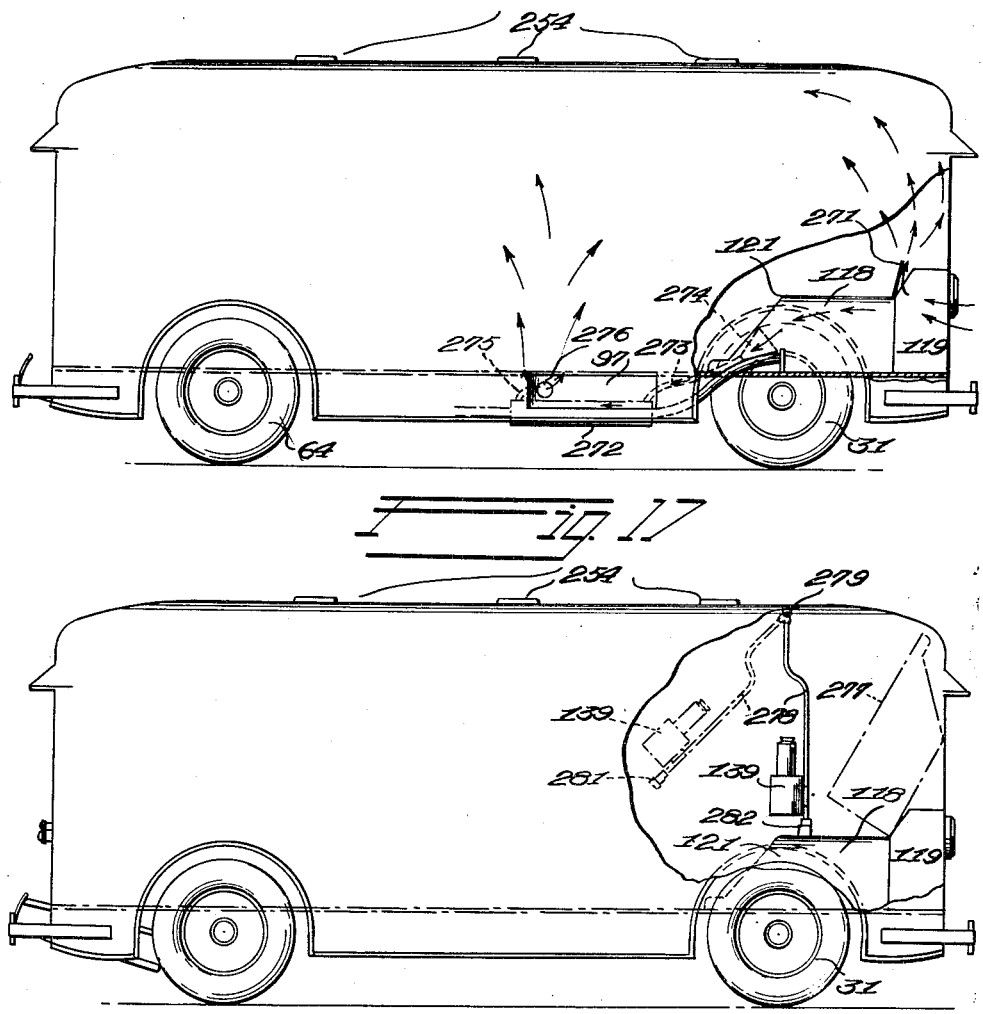

May 31, 1932.   W. B. FAGEOL   1,861,001
MOTOR COACH
Filed Oct. 18, 1929   10 Sheets-Sheet 10
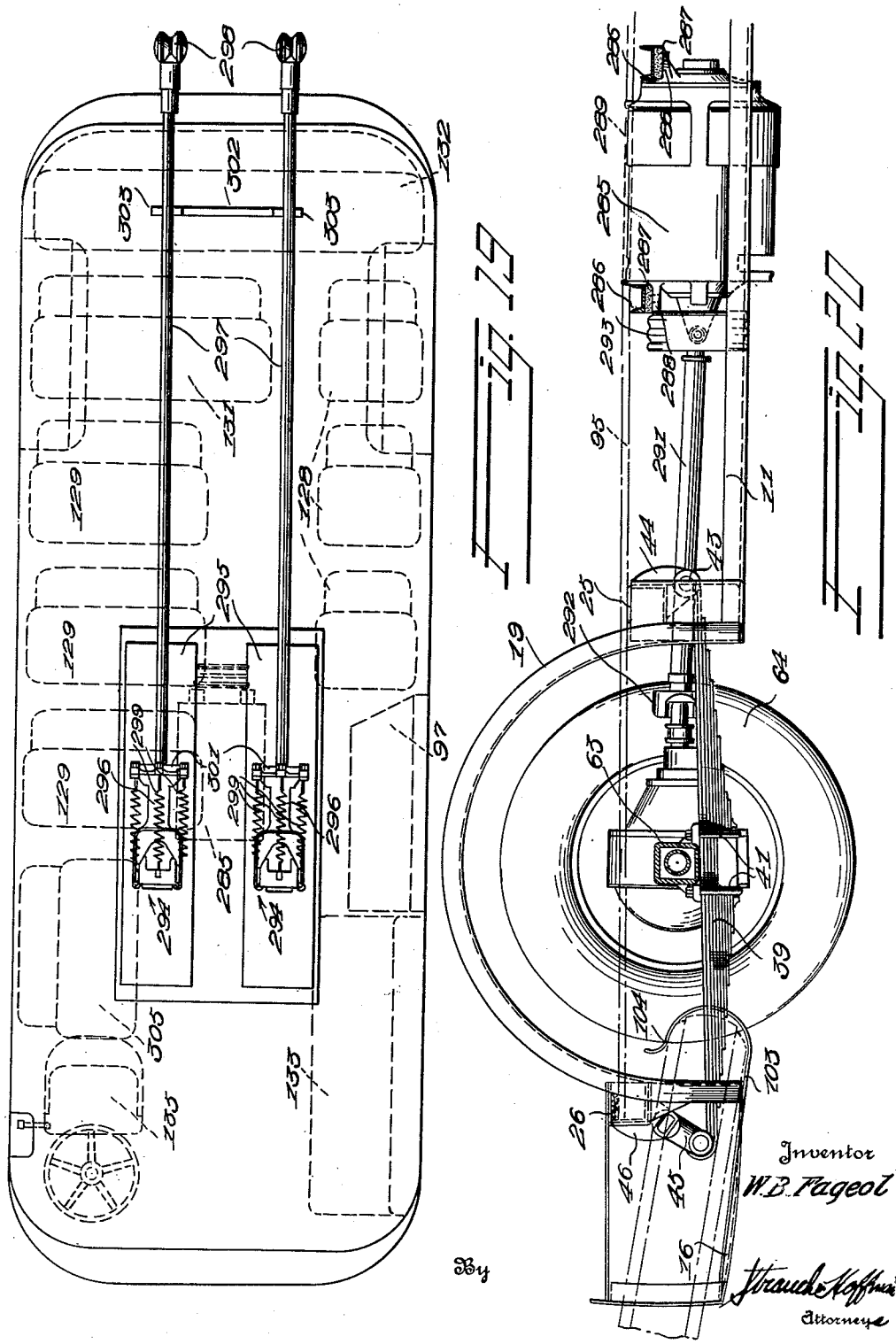

Patented May 31, 1932

1,861,001

UNITED STATES PATENT OFFICE

WILLIAM B. FAGEOL, OF KENT, OHIO, ASSIGNOR TO TWIN COACH COMPANY, OF KENT, OHIO, A CORPORATION OF DELAWARE

MOTOR COACH

Application filed October 18, 1929. Serial No. 400,689.

The present invention relates to automotive road vehicles, particularly of the passenger carrying type.

Passenger carrying busses, heretofore constructed, usually have the power plant disposed forwardly of the vehicle and arranged outside of the passenger carrying body. Moreover, in constructions generally in use, the power plant is secured to the chassis frame member so that the center of gravity of the power plant is relatively high. The passenger carrying capacity of the bus is accordingly restricted, because of the fact that the available wheel base is not utilized to provide passenger carrying space within the body, and such prior constructions have their center of gravity unnecessarily high.

This invention aims to house the forwardly disposed motor entirely within said passenger carrying body, and to dispose it relatively close to the forward axle, so that it protrudes a minimum amount into the interior of the passenger carrying body that houses it. The lowering of the motor can be readily brought about, because of the fact that, unlike prior constructions, the motor of this invention is mounted upon the structural elements constituting the frame of the passenger carrying body, rather than on chassis frame members. By avoiding the relatively deep chassis frame members, it is also possible to at the same time lower the floor line of the vehicle, thus further lowering the center of gravity and permitting the body to be made high enough to provide ample head room for the passengers in entering and leaving the body of the bus. Constructions heretofore proposed have, in an effort to maintain the center of gravity low so that they could, in practice, be operated at high speeds, brought the roof of the vehicle body too close to the floor to enable the passengers to move comfortably about within the vehicle body because of the lack of head room.

By disposing the motor entirely within the passenger carrying body, and by lowering the motor toward its adjacent axle so that it protrudes a minimum amount within the car body, and by providing a passenger carrying body of box-like form and of uniform width and height substantially from end to end, space is provided within the body on opposite sides of the engine that may be utilized in seating passengers and the operator of the vehicle, thus making available substantially greater space within the body for passenger and baggage carrying purposes than is available in busses now in general use. While the motor projects above the floor line of the body in the embodiment of the invention illustrated in this application, the cover that is preferably applied over the motor forms a shelf that may conveniently be utilized as a support for the fare box, when the bus is used for the carrying of passengers on established routes, or as a shelf for the storage of baggage within the passenger carrying body. By providing the passengers with a convenient space of this character for depositing their luggage, the aisles of the passenger carrying body may be maintained clear and full use made of the seating capacity because baggage will not in this event be placed in front of available seats. The bus of this application accordingly includes a body of maximum length for a given wheel base, in which substantially all of the space within the passenger carrying body is utilized for the purposes of transporting passengers and their luggage, and in which the center of gravity is kept relatively low.

In constructions at present in general use, because of the fact that the motor is generally supported on a chassis frame, the floor line of the vehicle cannot be brought as low as the top of the differential housing of the drive axle. This invention aims to provide a passenger carrying vehicle having a floor line that is lower than the top of the differential housing, and this is made possible by the absence of the heavy longitudinal chassis frame members. The slight protrusion of the differential housing above the floor line is taken care of by providing a recess in the body above said floor line into which the top of the differential housing can move as the springs bend when the vehicle moves over road irregularities. Such slight protrusion within the body does not restrict the passenger carrying capacity of the body, because it has been found that a seat can be placed over such protrusion so that the differential housing projects above the floor line of the body into space that is ordinarily wasted beneath the seat provided for passengers.

Accordingly, a primary object of the present invention is the provision of a novel single motor coach adapted for the transportation of a maximum number of passengers for a given wheel base, and having a very low center of gravity.

A further object of the invention is the provision of a novel coach construction embodying a passenger carrying box-like body and a power plant disposed on and supported by the structural frame members of the body in such manner that the weight of the body and load carried thereby is balanced on the several axles, though each axle may not carry substantially the same dead weight.

A still further object of the invention is the provision of a novel coach construction embodying a body, a single internal combustion engine and transmission supported directly by said body in close relation to an axle and so that the weight thereof is balanced on opposite sides of the axle, said body being provided with a relatively low floor, and seats so disposed with respect to the engine that a maximum number of passengers may be seated without restricting aisle space for the passengers.

A still further object of the invention is the provision of a novel coach construction comprising a body including a relatively light base frame construction, forwardly disposed power and transmission, mechanism supported by said frame construction and housed by the body, said frame construction including a plurality of longitudinally spaced and transversely disposed frame members, front and rear axles respectively supported by dirigible and driven wheels disposed for movement between said transversely disposed members independently of the longitudinal members, said body provided with a relatively low floor in such manner that said wheels and portion of said power and transmission mechanism, though arranged as closely as possible over an axle, project relatively slightly above the floor, means concealing said projecting portions, and seats in said body for accommodating a maximum number of passengers, some of said seats being disposed over and at both sides of said means.

A still further object of the invention is the provision of a novel coach construction comprising a body, power and transmission mechanism, and dirigible and drive wheels directly connected with said body, said body provided with a relatively low floor with said wheels and portions of said power and transmission mechanism projecting above same, housings concealing said projecting wheels and power and transmission mechanism, seats in said body including an operator's seat adjacent said housing for said power mechanism, some of said seats disposed over said housings, a combined entrance and exit door adjacent said housing for said power mechanism, and a fare box supported on said housing.

A further object of the invention is to provide novel heating and ventilating means taking full advantage of the favorable location of the power plant entirely within the body to be heated, and of the air flowing through the radiator of the power plant through the front wall of the body.

A still further object of the invention is to provide an improved manner of constructing a vehicle in which the final control elements of the vehicle control devices are installed in one operation in a relatively narrow space between a side wall of the body and a side of the motor by conveniently assembling said elements on a bench with a floor section, that may be positioned directly in the body so as to bridge the space between the side wall of the body and the side of the motor, thus locating said elements at the same time whereby the cost of assembly of the vehicle is materially reduced.

This invention also aims to provide an improved vehicle wheel having brake drums secured to and removable as a unit therewith, and including improved means for cooling the brakes and preventing any lubricant that may escape from between the hub and axle from contacting with said brakes.

Figure 4 is a top plan view of the body base frame construction and disclosing a preferred arrangement of power and drive mechanism and connection thereof to said base frame construction.

Figure 5 is a longitudinal section of the construction illustrated in Figure 4 immediately inwardly of the near wheels.

Figure 6 is a top plan view more or less diagrammatic in nature illustrating the preferred seating arrangement in the coach according to the previous figures.

Figure 7 is a longitudinal section of Figure 6 particularly illustrating in elevation the relative dispositions of the seats and power and drive mechanism.

Figure 8 is a view similar to Figure 6 disclosing a modification of the invention.

Figure 9 is a longitudinal section of the construction illustrated in Figure 8.

Figure 10 is a perspective view of the interior of a coach similar to the construction illustrated in Figures 8 and 9 looking toward the front end thereof.

Figure 11 is a top plan view of a metal floor board assembly, embodied in the present invention.

Figure 12 is a side elevational view of the floor board assembly as seen in the direction of arrow 12, Figure 11.

Figure 13 is a substantially central longitudinal sectional view of the floor board assembly illustrated in Figure 11.

Figure 14 is an outer elevational view of a wheel construction in a preferred embodiment thereof as employed with the coach forming the subject matter of the present application.

Figure 15 is a sectional view substantially on line 15—15 of Figure 14.

Figure 16 is a fragmentary transverse sectional view of the wheel structure illustrating the application thereof to an axle housing as well as the attachment thereto of a brake drum and pneumatic tire and rim assembly.

Figure 17 is a side elevational view of a coach, more or less diagrammatic, particularly illustrating a novel heating arrangement embodied in the present invention.

Figure 18 is a view similar to Figure 17, disclosing a modified form of motor housing and fare box support.

Figure 19 is a top plan view of a coach constructed in accordance with a further modification of the invention.

Figure 20 is a fragmental longitudinal section, particularly illustrating the driving mechanism employed in the modified construction illustrated in Figure 19.

Figure 1:
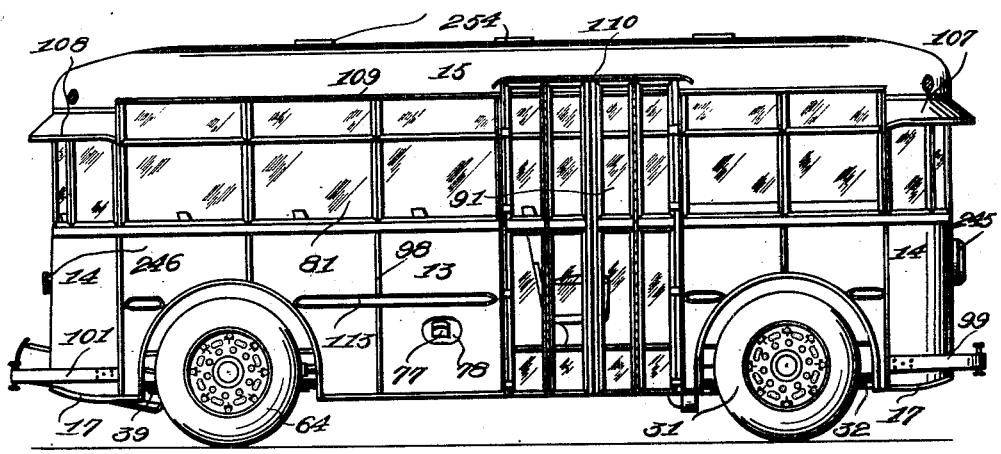
Figure 1 is a right side elevational view of a coach constructed in accordance with a preferred embodiment of my invention.

Referring to the accompanying drawings by reference characters in which like characters designate like parts and referring particularly to Figures 4 and 5 in which is illustrated the body base frame construction, as well as the power and driving mechanism in a preferred embodiment thereof, 11 designates an iron marginal supporting member of L-section, which is of relatively light construction and which as indicated in Figure 4 is of rectangular formation with the corners thereof arcuate to provide the curved or arcuate corners of the body. Rigidly connected to member 11 are vertically disposed relatively light T-irons 12, which irons form a support for the body sides 13 and ends 14, illustrated in Figures 1, 2 and 3. These irons 12 are of arched formation for supporting the roof 15. The member 11 at the arcuate corners thereof is slightly curved upwardly toward the opposite ends as indicated at 16, providing a similar effect to the body as indicated at 17 in Figure 1. Member 11 is interrupted adjacent each corner thereof, as indicated at 18, to the spaced ends of which are secured the ends of arcuate wheel housing supporting members 19 likewise of L-section. Member 11 is further interrupted at the right hand side thereof adjacent the forward wheel housing supporting member 19 as indicated at 21, for a purpose hereinafter described.

Secured to the member 11 are the opposite ends of a channel bar 22 which is disposed closely adjacent the front end of member 11 and transversely thereof. Disposed rearwardly of bar 22 and parallel therewith is a similar bar 23 the opposite ends of which are secured to the adjacent members 19 by means of brackets 24, the bar 23 being disposed somewhat lower than bar 22 as indicated in Figure 5. Disposed transversely of member 11, adjacent the front and rear of the rear housing supporting members 19 are channel bars 25 and 26 respectively similar to bars 22 and 23, the opposite ends of bar 25 being secured to members 19 by means of brackets 27, and the opposite ends of bar 26 being secured to members 19 by means of brackets 28.

The construction so far described constitutes the frame of the vehicle body and said frame is utilized to support the power plant and the axles are conveniently secured to the transversely disposed frame members by means of springs of conventional form. This construction of the body, in view of its box-like nature and the truss effect of the sides and roof on the base frame thereof resulting from this, permits the utilization of the base frame to support the power plant and as a means for the attachment of the axles, thus avoiding the customary heavy longitudinal frame members in order to serve this purpose. Such heavy longitudinal members not only increase the dead weight but serve to raise the floor line of the vehicle and consequently its center of gravity.

Disposed between transversely extending bars 22 and 23 is a front axle 29 which is supported by the dirigible wheels 31. Axle 29 is disposed substantially centrally intermediate bars 22 and 23, and yieldably secured thereto by means of leaf springs 32 which are secured intermediate their ends to axle 29 by means of U-bolts 33. The forward ends thereof are pivotally connected at 34 to brackets 35 secured to bar 22. The rear ends thereof are flexibly secured to shackles in usual manner which shackles are secured to brackets 37 rigidly connected to bar 23.

Disposed intermediate bars 25 and 26 and parallel therewith is the rear drive axle 38 which is yieldably connected to bars 25 and 26 by means of leaf springs 39, which are rigidly secured by U-bolts 41 to seats 42 on the under side of axle 38. The forward ends of springs 39 are pivotally connected at 43 to brackets 44, rigid with bar 25, and the rear ends of springs 39 are pivotally connected to shackles 45, which in turn are pivotally connected to brackets 46 rigid with bar 26.

It will be seen from the foregoing that axles 29 and 38 are yieldably connected through springs 32 and 39 to the longitudinally spaced transversely disposed bars 22, 23, 25 and 26, so that the axles have unrestricted vertical oscillating movement in view of the absence of the commonly employed longitudinal members and beneath which, in proximity thereto, the axles ordinarily extend.

Disposed transversely of member 11, substantially intermediate bars 23 and 25, is a relatively wide channel bar 48 with the opposite ends thereof secured to member 11 immediately rearwardly of the interruption 21 in member 11. Secured to bar 48 inwardly of the opposite sides of member 11 are the rear ends of transversely spaced longitudinally extending parallel beams 49, which beams 49 adjacent the forward ends thereof are supported on and secured to bar 23 by brackets 51, the beams 49 projecting forwardly of bar 23 a substantial distance to form cantilever beams. Said beams are provided on the forwardly projecting ends with journals 52, in which are rotatably disposed the transversely opposite trunnions 53 of motor 54. The forward end of motor 54 is secured by bolts 55 to the outer flange of bar 22, suitable cushioned washers 56 being disposed on either side of said flange, and through which said bolts 55 project for providing a yieldable connection of the motor to the body base frame construction. The motor 54 has associated therewith a radiator 58 embodying a header 59 provided with a filling nozzle 61.

Figure 2:
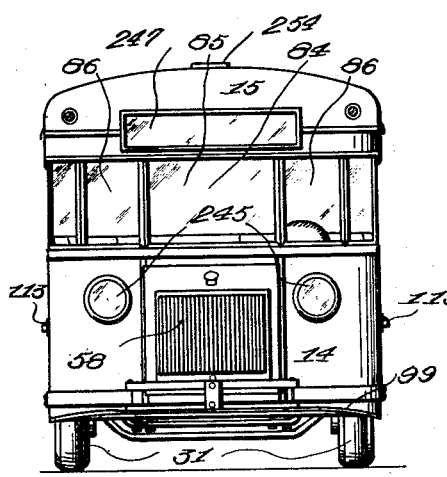
Figure 2 is a front elevational view of the coach construction illustrated in Figure 1.

It will be observed upon inspection of Figure 4 that beams 49 and likewise motor 54 are arranged slightly to the left of the longitudinal center line of member 11, for a purpose later described. While motor 54 is as above stated laterally offset, radiator 58 is centrally disposed and opens through the front of the body as indicated in Figure 2. It is also to be observed that the differential 63 in axle 38 is centrally disposed, whereby interchangeable drive axle sections may be employed for driving the drive wheels 64. Due to the offset relation of motor 54, relative to differential 63, an angular drive connection is provided between transmission 65, associated with motor 54, and the differential 63. Said shaft embodies a drive shaft section 66 which is provided adjacent the forward end thereof with a drive shaft brake construction 67, and which at the opposite end thereof is journaled in a midship bearing 68 suitably supported by bar 48. Secured to the rear end of section 66 through a universal joint 69 is the forward end of a telescoping drive shaft section 71, whose opposite end is connected to differential 63 through a universal joint 72. Thus it will be seen that the motor 54 and differential 63 are operatively connected by a drive shaft embodying sections 66 and 71, which, as seen in Figure 5, are disposed in the same horizontal plane and that in plan, as seen in Figure 4, section 66 is parallel with the opposite sides of member 11 while section 71 is disposed at a slight angle to section 66.

Interconnecting bars 25 and 48 is a longitudinally disposed bar 74, and suitably supported by bar 48, bar 74 and a bracket 75 secured to member 11 is a gas tank 76 provided with a filling nozzle 77 accessible through an opening 78 in the side of the body, as illustrated in Figure 1. Interconnecting bars 23 and 48 slightly inwardly of the ends thereof opposite interruption 21 is a member 79 for a purpose hereinafter described.

The motor 54 has associated therewith the various necessary control apparatus forming no essential part of the present invention, except for the arrangement and disposition of the operating control devices hereinafter described.

Figure 3:
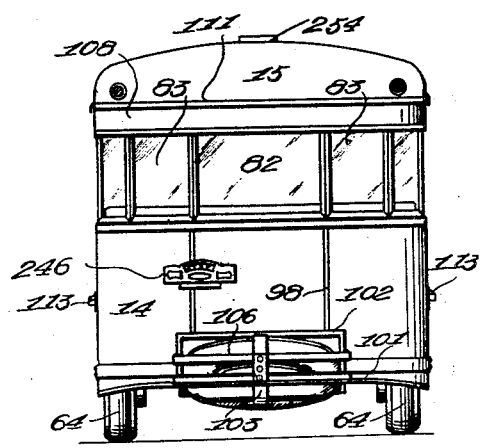
Figure 3 is a rear elevational view of the coach construction illustrated in Figure 1.

The base frame construction above disclosed, embodying member 11 and the various recited transverse bars, while serving as the sole attachment for the power and driving mechanism is a part of the coach body forming the base thereof, the T-irons or body posts 12 being secured at the inner ends thereof to member 11 and forming a skeleton framework for the body sides and ends 13 and 14 respectively, which, as indicated in Figures 1, 2 and 3, comprise ply metal below the window lines, and #18 gauge steel above the window lines, the posts 12 defining with the lower and upper body portions rectangular window spaces in which are disposed windows 81 in the opposite sides of the body, which, with the curved rear windows embodying a centrally relatively wide sash 82, intermediate relatively narrower sashes 83 together with the windshield 84, embodying a central relatively wide sash 85 intermediately relatively narrower sash 86, provide clear unobstructed vision throughout the entire perimeter of the coach body. The sashes 86 of windshield 84 are of the flat drop type while the corresponding rear sashes 83 are rounded. The body posts 12 are arched at the outer ends thereof for the support of roof 15 which embodies a central section of ply metal and sides and ends formed of #18 gauge steel lined inside with aluminum and sealed at all joints with a compound to prevent leaks and treated with a priming to prevent rust. The ply metal center and double sheeted roof sides provide excellent insulation.

The coach body is provided with a door 91 (Figures 1 and 10) which, as indicated in Figure 1, is arranged at the right hand side of the body forwardly of the transverse center line or immediately behind the right front wheel housing supporting member 19. The door 91 may be of the four-leaf fold-out type in two sections, constructed of extruded aluminum and having removable glass panels. The door is operated pneumatically through operating means concealed within a housing 92 above door 91, as indicated in Figure 10, which means is under control of the operator. Any other suitable door operating means may be provided. A stanchion post 93 is located within the body centrally of door 91, arranged so that passengers will use the forward section of door upon entering, while those leaving will use the rear section of the door.

A floor 95 is suitably disposed upon and supported by the body base frame construction and is preferably constructed of seven-ply laminated fir ply-wood, especially treated for protection against moisture, laid in a special sealing compound to protect against weather and to eliminate squeaking at the joints. On said floor is cemented $\frac{3}{16}''$ "battleship" linoleum with special waterproof cement, which linoleum is also sealed around the edges and joints to prevent water from seeping in. The floor 95 is disposed relatively low, the height of same from the roadway being somewhat in excess of a comfortable stepping distance, and, accordingly, a recessed door step 97 as clearly indicated in Figures 6 and 7 is provided immediately inwardly of door 91. Said step is supported on member 79 before referred to. It is of the same width as door 91 adjacent same and is preferably provided with a rear angularly disposed wall 98 for providing maximum floor space on the level of the main floor.

The coach body, as indicated in Figures 1-3, is exteriorly finished in panel effect by the application of finishing strips 98 exteriorly of body posts 12, and the body is provided with front and rear bumpers 99 and 101 of spring steel. The rear bumper 101 is provided with a hinged section to allow access to a spare tire carrying receptacle, defined by a rectangular opening 102 in the rear of the body. A tire supporting member 103 secured to member 11 and provided with an inner curved tire engaging end 104, as illustrated in Figure 5, holds the spare tires in place. The bumpers 99 and 101 are tied to the body near the center and at the ends in a manner so as to distribute the shock evenly, and thus provide ample protection at both the front and rear ends of the coach. The spare tire, such as indicated at 106, when in position further contributes to the yieldability of the rear bumper 101.

The body is provided with front and rear visors 107 and 108, which are preferably of sheet aluminum and readily removable. The body is further provided with drip ledges 109, 110 and 111 above the windows, door and visors respectively, thus giving protection around the entire edge of the roof. The body is further provided with substantially V-shaped metal collision strips 113 at the sides of the body which guard against injury to the body sides in the event of contact or collision with other objects.

It will be seen upon inspection of Figures 1 to 7 inclusive that the coach body projects laterally beyond the wheels 31 and 64, and in order to conceal the portions of the wheels projecting above floor 95, front and rear wheel housings 115 and 116 are provided which are secured to the wheel housing supports 19, thus defining outwardly opening recesses for the upper portions of the wheels. While floor 95 is disposed relatively low, the motor 54 and differential 63 project above the floor and in order to conceal these projecting parts, a housing 117 is provided in floor 95 immediately over the differential 63, which housing is of sufficient depth to allow for maximum vertical oscillation of the differential occasioned by movement of axle 38 due to road irregularities. The upwardly projecting portion of motor 54 is concealed within a motor housing 118, embodying a relatively high portion 119 for concealing radiator 58, a relatively lower portion 121 for concealing motor 54 proper and a still lower portion 122 for concealing the fly-wheel housing and transmission mechanism 65.

It will be seen from the foregoing disclosure that a coach construction is provided comprising a body embodying a relatively light base frame structure to which the power and driving mechanism is directly secured, the base frame structure embodying transverse bars to which the axle supporting springs 32 and 39 are secured with the axles 29 and 38 disposed between the transverse parts for unobstructed vertical oscillation under the resilient restriction of springs 32 and 39, the housing 117 providing for vertical movement of differential 63. In order to provide unrestricted vertical oscillation of front axle 29, the rear of the oil pan of motor 54 is recessed directly over axle 29 as indicated at 125 thus providing ample space above axle 29 for vertical movement of the axle in spite of the low disposition of the motor.

The body defined by floor 95, sides 13, ends 14, and roof 15 in accordance with the arrangement above described is adapted for maximum passenger carrying capacity for a given wheel base. It provides seats for 21 passengers in the form shown together with a relatively wide unobstructed aisle 127 for a large number of standees. The roof is spaced from the floor so that full head room is provided in said aisle. The seats may comprise three single seats 128 rearwardly of door 91, three dual seats 129 on the opposite side rearwardly of housing 118, a triple seat 131 opposite the rearmost seat 128, a four-passenger seat 132 at the extreme rear end of the body extending the full width thereof, a triple seat 133 at the right side of the body immediately forwardly of door 91, and, to the right of housing 118, a dual seat 134 at the left side of the body disposed over portion 122 of housing 118. In addition, a driver's seat 135, forwardly of seat 134 is disposed on portion 122 of housing 118. Seats 128, 129, 131, 132 and driver's seat 135 all face forwardly while seat 133 faces sidewise and seat 134 faces rearwardly. Seats 133, 134, rear seat 128, and seat 131 are disposed over wheel housings 115 and 116 and seat 131 further extends over differential housing 117, with the adjacent end of seat 131 together with rear seat 128 defining an aisle 136 leading from main aisle 127 to the rear seat 132, which rear seat is constructed over an inclined floor member 137 at the rear end of floor 95 immediately over the spare tire carrying receptacle.

It will accordingly be seen from the foregoing disclosure that motor 54, wheels 31 and 64 and differential 63, where they project above floor 95, are disposed beneath seats in such manner as to not substantially restrict the seating capacity and foot room for a maximum number of passengers. It will be seen further that the seats, while disposed for the accommodation of a maximum number of seated passengers, are so arranged as to provide a relatively wide aisle 127 which not only provides for a convenient admission and discharge of passengers but further provides convenient standing room for a relatively large number of passengers to meet unusual traffic conditions. It will also be seen from the foregoing that the seats for the passengers are so disposed that they are all readily accessible from the level unobstructed floor 95 and that the driver's seat 135 is arranged at the front left corner of the body beside motor housing 118 in space that would not lend itself to ready entry and exit.

By mounting motor 54 slightly off center and mounting same by a cantilever arrangement on the projecting ends of members 49, ample foot room is provided between housing 118 and seat 133. In order to provide still additional floor room the wheel housing 115 over which seat 133 is disposed may be made irregular in outline, as indicated at 138, providing only sufficient clearance for the necessary steering movement of wheel 31.

It will be seen upon inspection of Figure 6, that door step 97 is disposed at the front end of aisle 127 which is relatively close to motor housing 118. On said housing is arranged a fare box 139, which is not only convenient to entering passengers, but is also disposed such that it can be conveniently observed by the operator from seat 135 and so that the operator can make change if necessary.

The driver's seat 135 is of the bucket type and is adjustable forwardly and backwardly. The seat 134 is arranged on the level of portion 122 of housing 118, and a metal floor board assembly 141 is removably disposed in the front left corner of the coach body immediately forwardly of seat 135. The floor board assembly 141 is illustrated in detail in Figures 11, 12 and 13, wherein it will be seen that the floor board comprises a casting 142 which in plan is of a contour to accurately conform with the curved corner of the coach body, the casting 142 serving for the assembling therewith of the clutch and brake pedals, accelerator and hand brake lever, etc., on a bench whereby the complete assembled unit can be dropped into position in the space at the front left corner of the body thereby greatly simplifying the assembly of the coach.

The casting 142 embodies a rear horizontal flange 143 for engagement with the floor, a relatively wide portion 144 co-planar with flange 143, and which, as indicated on Figure 11, overhangs the corresponding vertical wall 145 of casting 142. The casting 142 is depressed substantially below flange 143 and portion 144 for defining a well portion for the operator's feet, the well portion, comprising a depressed relatively narrow horizontal base portion 146, and a relatively wider inclined base or foot rest portion 147, which, as indicated in Figure 11, is suitably roughened to provide a friction surface. The portion 147 is bound by a marginal flange 148, which as indicated in Figure 11 is recessed to accommodate the body posts 12. A soft felt strip 149 is disposed between flange 148 and the body, as well as the radiator housing, for cushioning and insulating purposes. The casting 142 is provided with a raised portion 151 to which the steering post boot 152 is detachably secured, by means of screws 153, for the accommodation of the steering post 154 in which the steering column is mounted for actuation of a worm in housing 155 for actuating lever 156 which operates the drag link 157 indicated in Figure 4, the link 156 together with the operating mechanism therefor being supported in a bracket 158 secured to channel bar 22 and anchored to one of the posts 12 by means of a bracket 159.

Integral with side 145 are bearings 161 and 162 for reception of a gear shift rod 163 to which is secured intermediate bearings 161 and 162 a bracket 164 in the outer end of which is engaged the inner ball end 165 of a shift lever 166, which has a universal movement in a bearing bracket 167 detachably secured to the flat portion 144 of casting 142. Depending from the angular portion 147 are a pair of brackets 168 and 169 through the inner ends of which extends a trunnion shaft 171, on which is fulcrumed a hand brake lever 172 provided with the usual ratchet relief rod 173 for releasing pawl 174 from the ratchet quadrant 175 disposed between brackets 168 and 169. Depending from base portion 146 are a pair of brackets 177 in which are journaled a clutch actuating shaft 178, which is rotated through lever 179 in turn actuated by clutch pedal 181, the shaft 178 being operatively connected with the clutch mechanism associated with motor 54.

Further supported by brackets 177 on shaft 178 is a brake actuating arm 182 for operative connection with the inner end 183 of hand brake lever 172, and a second actuating arm 184 is pivotally supported by shaft 178 which is operatively connected with the foot brake lever 185 provided with a foot pedal 186. Pivotally connected at 187 in brackets 188 on inclined portion 177 is a foot accelerating lever 189 provided with a lever 191 which through the adjustable connection 192 imparts movement to lever 193 which is pivotally connected intermediate its ends at 194 between the inner ends of brackets 195 secured to the under surface of foot portion 146, an accelerating rod being suitably connected to the free end of lever 193. A suitable foot rest 197 is provided adjacent pedal 189. A starter button 198 is disposed in portion 146 adjacent the left side of casting 142 and left and right turn signal regulating buttons 199 are disposed in portion 147 to the left of clutch pedal 181.

From the foregoing disclosure it will be seen that a metal floor board assembly is provided comprising a casting to which the operating mechanism including the clutch and brake pedals, accelerator pedal, hand brake lever, shift lever, starting and turn signal buttons as well as the steering column boot may be readily secured prior to arranging the casting in the car body, the casting further forming a well substantially below the operator's seat thus providing ample foot room for comfortable operation by the operator. It will be understood, of course, that the various control levers are operatively connected after assembly of casting 142 in the car body.

The wheels 31 and 64 may be of any desired construction but in accordance with the present invention a relatively large pneumatic tire is preferably employed for maximum cushioning. Such tires necessitate a relatively small wheel. Accordingly, a specially constructed wheel is provided, one of which is illustrated in detail in Figures 14, 15 and 16, wherein it will be seen that the wheel, which is illustrated as a rear wheel 64 but which is identical with the front wheel 31, comprises an integral wheel construction proper 201, which comprises a hub section 202 through which the end of a drive axle section extends and to which it is suitably keyed into the key slots 203 formed in the internal ribs 204, the hub 202 being further provided with a lubricant channel 205. Integral with hub portion 202 is a disk portion 206 which merges into a felly portion 207, which felly portion overhangs hub portion 202 in an outward direction and embodies a uniform irregular circular surface defining alternating depressions 207' and ridges 208. The irregular circular surface defined by depressions 207' and ridges 208, slope inwardly toward the outer end of hub portion 202, as indicated at 209, thus defining a conical rim seating surface on felly 207. The depressions 207' as will be seen from Figure 14, are wedge shaped and are adapted to receive anti-creep lugs on a rim 211 (Figure 16) which lugs conform to the conical surface 209. Said rim embodies a detachable flange seating portion 212 the inner surface of which conforms to the conical surface 209 of ridges 208, a pneumatic tire 213 being removably mounted on rim 211 by means of a detachable rim flange 214 removably engaged with portion 212. The rim 211 with tire 213 positioned thereon is secured on felly 207 by means of a plurality of rim clamping lugs, which, at the outer ends thereof, engage portion 212, and at the inner ends thereof engage projections 215. Bolts extend through the lugs into threaded bores 216 whereby the lugs have a fulcrum action about projections 215 for firmly and uniformly wedging rim 211 into fixed relation with felly 207, the conical surface 209 facilitating the attachment of rim 211 to felly 207.

The disk portion 206, adjacent projections 215, is provided with a plurality of apertures 218 for the reception of bolts adapted to project through aligned apertures 219 in a vertical flange 221 of a cast iron brake drum 222, which as indicated in Figure 16, is disposed on the inner side of disk 206 beneath the overhanging portion of rim 211. The drum 222 embodies a cylindrical portion 223, which merges into flange 221 through a conical portion 224. Drum 222 at the junction of flange 221 with conical portion 224, is provided with a shoulder 225 which is accurately machined for seating engagement within a correspondingly accurately machined projection 226 on felly 207 whereby drum 222 is not only easily centered but when assembled it will rotate truly circular which is important from a braking standpoint. The cylindrical portion 223 is provided externally thereof with reinforcing ribs 227 outwardly of the inner brake shoe cylindrical engaging surface 228.

The disk portion 206 is provided with a plurality of brake ventilating openings 229, whereby air is caused to circulate within drum 222, and thus cool the brake. In order to confine the air into proximity to the brake, a baffle plate 231 is detachably secured at 232 to the axle housing 38 in proximity to the inner edge of drum 222. Said plate is provided with a recessed marginal portion 233 embodying a horizontal lip 234 for deflecting the air toward drum 222. Plate 231 besides functioning as above described, further serves as a protector of drum 222, preventing dirt and water from readily entering the brake recess. The hub 202 at the junction thereof with axle housing 38 is provided with an oil seal 237. Disk portion 206, adjacent the junction thereof with hub 202 is provided with an inwardly directed conical flange 238, the edge of which terminates closely adjacent seal 237. Said flange together with hub 202 and disk 206 defines a circular channel 239 reinforced by ribs 241 into which channel any oil that may leak by seal 237 is collected. From said channel the oil will escape through apertures 242 in a conical portion 243, which integrally connects hub 202 and disk 206, whereby any oil which may escape from seal 237 will not get on the brake linings. Hub 202 at the outer end thereof is provided with a plurality of apertures 244 for the reception of bolts for the attachment of a suitable hub cap.

From the foregoing disclosure it will be seen that a novel wheel construction is provided well adapted for coaches of the character described, and which is so constructed that relatively large pneumatic tires may be employed, and which is further constructed for the ready attachment and detachment of the tire, as well as providing for the association therewith of a brake construction, and embodying means for cooling the brake construction and other means for preventing lubricant from gaining access to the brake construction.

The coach above described is provided with all necessary equipment comprising headlights 245, a combined stop and direction signal 246, preferably controlled by buttons 199, (Figure 11) a destination indicating device 247 which is accessible through a door 248 inside the coach body as indicated in Figure 10 in known manner. Interiorly the coach body, as more particularly indicated in Figure 10, is provided with suitable hand rails 249 for standing passengers. The body is further provided with dome lights 251, push buttons 252 readily accessible to both seated and standing passengers. A rear vision mirror 253 may be positioned on door 248. The body is further constructed for sufficient ventilation by the provision of a plurality of adjustable ventilators 254 in the roof thereof and the opposite side flat front windows 86 are mounted whereby same can be lowered thus establishing a circulation of air through the coach body.

In Figures 8, 9 and 10 is disclosed a modification of the invention with respect to the driving and seating arrangement. In accordance with this embodiment of the invention, motor 54 is disposed centrally of the body instead of being offset laterally as in the preferred embodiment of the invention, and the rear axle sections are driven through an underslung worm drive 255 which is also central of the sides of the body and in longitudinal alignment with motor 54. The driving connection between motor 54 and worm drive 255 embodies a horizontal drive shaft section 256 having a universal connection 257 with motor 54 and which, adjacent the opposite end thereof, is operatively mounted in a midship bearing 258 adjacent to which a universal joint connection 259 is provided with the adjacent end of an angularly disposed drive shaft section 261, which at the opposite end thereof, is connected through a universal joint 262 with worm drive 255. The remaining power and drive mechanisms are substantially the same as that disclosed in connection with the preferred embodiment of the invention, with the exception that rear springs 39 are secured above the axle housing thus making it desirable to provide a rear raised portion 264 in floor 95'. The raised portion 264 of the floor provides ample clearance for the differential housing of the rear axle when the springs 39 bend as the vehicle moves over road irregularities. Portion 122' of housing 118' may extend the full width of the body as clearly indicated in Figure 8. The floor line at the point of entry and exit in the body is accordingly kept very low.

The seating arrangement in accordance with this embodiment of the invention differs from that above disclosed with reference to the preferred embodiment of the invention in the following respects. A dual side facing seat 265 is disposed behind operator's seat 135 and directly opposite door 91 on the central main level portion of floor 95'. A pair of dual forwardly facing seats 266 are arranged at each side of the body rearwardly of door 91, and defining therebetween an aisle 267, the rearmost seats 266 being arranged partially over the elevated portion 264 of floor 95'. Arranged on portion 264 at each side of the body over each wheel housing is a side facing seat 268 between which seats is a relatively wide aisle 269 leading to a wide forwardly facing rear end seat 132, which is arranged on the level elevated floor portion 264.

While the arrangement of Figures 6 and 7 is at present preferred, the arrangement disclosed in Figures 8, 9 and 10 embodying an underslung worm drive arrangement, provides the same seating capacity as in the preferred arrangement while providing more space adjacent seat 133 for the admittance and discharge of passengers.

In Figure 17 is illustrated more or less diagrammatically, a heating arrangement well adapted to the type of coach embodied in the present invention, wherein motor housing 118 at the junction of portions 119 and 121 is provided with an adjustable door 271 controlling an opening in the housing for admitting a regulated volume of heated air from the upper or hottest portion of the radiator, the door 271 acting as a baffle to deflect the heated air into contact or proximity to the wind-shield, as indicated by arrows in Figure 17, whereby the tendency of frosting the wind shield in cold weather is substantially eliminated. The heating arrangement further comprises a heater 272 in the form of a casing surrounding the muffler of the motor. Air in housing 118 is forced by the fan through tube 273 communicating with heater 272. Preferably the air is collected by a funnel shaped end 274 of tube 273 from within housing 118 thereby collecting a relatively large volume of air. The opposite end of heater casing 272 is in communication through a tube 275 with a suitable shutter arrangement 276 disposed in the longitudinal vertical wall of door step 97. By directing the heated air into the car body from the door step 97 the car body is initially heated at the coldest portion thereof and besides the upward circulation of heated air at this point tends to restrict the admission of cold air when the door is open. It will be understood of course that heated air may be directed to additional points within the car body from the heater casing 272.

In Figure 18 is disclosed a still further embodiment of the invention wherein portion 121 of motor housing 118 is hinged to portion 119 for vertical swinging movement to the position indicated in dot and dash lines at 277 for ready access to motor 54. In order that portion 121 may be elevated as indicated, the fare box 137 is secured to the lower end of a stanchion 278 which is pivoted at the upper end thereof to a suitable bracket, indicated at 279, whereby the stanchion with the flare box 139 may be swung to the position indicated by dot and dash lines at 281, permitting vertical swinging of housing portion 121. The lower end of stanchion 278 and/or housing 121 is provided with any suitable detachable cooperating securing member 282 for effecting connection between housing section and said stanchion, as for example by a suitable slot and pin connection.

In Figures 19 and 20 is disclosed a modification of the invention, wherein the coach is electrically driven instead of being driven by an internal combustion engine according to the first forms of the invention.

The coach in accordance with this embodiment of the invention, is provided with an electric motor 285, which, as indicated in Figure 19, is disposed centrally of the opposite sides of the body and substantially centrally of the length of the body and in substantial transverse alignment with the door step 97.

The motor 285 is disposed immediately beneath the floor as indicated in Figure 20 and is preferably supported by transversely disposed channel body frame members 286, entering into the body base frame construction. Motor 285 is, preferably, yieldably secured to channel members 286 by interposing yieldable pads 287 between channels 286 and lugs 288 integral with motor 285 and suitably securing the lugs to the channels by bolts or other fastening means.

By yieldably supporting the motor in the manner disclosed, jars and vibrations are absorbed and furthermore the motor is less liable to damage. The floor 95 is preferably provided with a door 289, as indicated in Figure 20, immediately above motor 285 whereby access thereto may be readily attained.

The drive wheels 64 are driven by motor 285 through the drive shaft 291 provided with a universal joint 292 adjacent axle housing 63, and provided with a universal joint adjacent motor 285 within a brake construction 293.

Electric energy may be supplied to motor 285 through trolley or collector assemblies 294 similar to that disclosed in my co-pending application Serial No. 339,720, filed February 13, 1929, but the coach in accordance with the present embodiment is adapted for trackless roads, and as a consequence a pair of such collector assemblies are required instead of a single one, as disclosed in said co-pending application in which the rails serve as a return in well known manner.

Each collector assembly, the detail construction of which is disclosed in said co-pending application, comprises generally a plate 295 on which is disposed a support 296 to which is pivotally connected an end of a trolley pole 297 whose opposite or free end is provided with a grooved contact roller 298. The pole 297 of each assembly is yieldably maintained in raised or operative position by means of helical springs 299 adjacent ends of which are adjustably secured to a bracket 301 on pole 297 and the opposite ends of which are secured to support 296. An anchor bracket 302 is secured to the coach body roof for maintaining poles 297 in lowered or inoperative position by engagement thereof beneath projections 303 of bracket 302.

The construction as illustrated is a right hand drive which is used in some localities but the usual left hand drive may be employed if desired.

The seating arrangement is substantially the same as that disclosed in Figures 6 and 7 with the exception that in accordance with the present embodiment the rearwardly facing seat 134, as disclosed in Figures 6 and 7, is replaced by a side facing seat 305. The floor line is maintained low and the differential is disposed beneath seat 131 with freedom to oscillate in a recess beneath said seat.

The present construction provides a coach of the trackless trolley type in which the desirable features of the above disclosed constructions are present with the additional advantage of considerably more floor space adjacent the front end of the body due to the elimination of the internal combustion engine 54. This space may be utilized to store baggage or seats may be arranged therein. It will be obvious that with the usual left hand drive the seats will be arranged in the manner disclosed in Figure 6.

It will be seen from the foregoing disclosure that a coach construction is provided which is well adapted for urban duty as same is of unitary and compact construction while capable of transportation of a maximum number of passengers.

By the provision of the seating arrangements disclosed together with the single combination entrance and exit door, and the relative disposition of the operator's seat with the fare box disposed between said door and said operator's seat, and the relatively wide aisle between said seats, passengers may be expeditiously transported.

It will further be seen that a compact coach construction is provided, the body of which comprises a relatively low floor above which the motor and wheels project, which projecting portions are concealed within housings which housings do not restrict the carrying capacity of the body since some of the seats are disposed over the wheel housings and the motor housing can readily be utilized for the support and transportation of baggage.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim as new and desire to secure by United States Letters Patent is:

1. A passenger carrying vehicle comprising a body, an internal combustion engine disposed adjacent the forward end of said body and housed thereby, axles beneath said body, springs interconnecting said axles and body, the lower limits of said internal combustion engine being in a substantially horizontal plane passing through the highest point of the forward axle, the casing of said engine above said axle being provided with a recess to permit the axle to oscillate above the lower limits of the engine casing as the springs that connect said axle to the body bend when the vehicle moves over road irregularities.

2. A passenger carrying vehicle comprising a body of box-like form, an internal combustion engine disposed adjacent the forward end of said body and relatively slightly projecting within said body and housed thereby, an axle disposed beneath said body and engine so that the weight of the engine is substantially balanced over said axle, a drive axle including a centrally disposed differential housing supporting the rear of said body, springs interconnecting said axles and body, a floor between said axles for said body disposed below the upper limits of said differential housing, seats at opposite sides of said forwardly disposed engine and over said differential housing, and a cover for said engine designed to support the baggage of the passengers.

3. A passenger-carrying vehicle comprising a body of box-like form; an internal combustion engine disposed adjacent the forward end of said body and relatively projecting partially within said body and housed thereby; an axle disposed beneath said body and adjacent said engine; a drive axle including a centrally disposed differential housing supporting the rear of said body, springs interconnecting said axles and body, a floor between said axles for said body disposed below the upper limits of said differential housing; seats at opposite sides of said forwardly disposed engine and over said differential housing; and a cover for said engine.

4. A passenger-carrying motor vehicle, comprising a frame; axles resiliently connected to said frame; wheels supporting each axle; an internal combustion engine supported adjacent the forward end of said frame; a passenger-carrying body housing said engine and said axles and wheels and having a floor level substantially below the tops of said wheels and said engine; a door opening in one side of said body; said engine being disposed laterally of the longitudinal center line of said vehicle on the side opposite said door opening to provide an enlarged passenger space between said engine and the side containing said door opening; and vehicle control mechanism on the other side of said engine.

5. A passenger-carrying motor vehicle, comprising a frame; axles resiliently connected to said frame; wheels supporting each axle; an internal combustion engine supported adjacent the forward end of said frame; a passenger-carrying body having a floor level substantially below the tops of the wheels and engine; housings for said wheels and engine extending into said body; a door opening in one side of said body; said engine being disposed laterally of the longitudinal center line of said vehicle on the side opposite said door opening to provide a comfortable passenger-space between said engine and the side containing said door opening; with a comparatively narrow vehicle width; and vehicle control mechanism and a driver's seat between said engine and the other side of said body.

6. A passenger-carrying motor vehicle, comprising a frame; axles resiliently connected to said frame; wheels supporting each axle; an internal combustion engine supported adjacent the forward end of said frame; a passenger-carrying body housing said engine and said axles and wheels and having a floor level substantially below the tops of the wheels and engine and above the wheel centers; a door opening in one side of said body; said engine being disposed laterally of the longitudinal center line of said vehicle on the side opposite said door opening to provide a passenger space of substantial width between said engine and the body side containing said door opening; a step inside said body adjacent said door opening the level of which is below the wheel centers; and a driver's seat and vehicle control mechanism between the other side of said engine and the side of said body opposite the side containing said door opening.

7. A passenger-carrying motor vehicle comprising a base frame and body of substantially uniform width and height from end to end and including sides, ends and a roof that serve to reinforce the base frame; forwardly and rearwardly disposed wheel supported axles spaced respectively from the front and rear ends of said body approximately equal distances to provide a balanced body arrangement on the axles; springs connecting said axles to said base frame; an internal combustion engine supported on a portion of said base frame; a floor in said body at a level substantially below the tops of the wheels and engine; a door opening in one side of said body; said engine being disposed laterally of the longitudinal center line of said vehicle on the side opposite said door opening to provide a comfortable passenger space between one side of said engine and the side of said body containing said door opening without excessive vehicle width; and vehicle control mechanism and a driver's seat between the other side of said engine and the side of said body opposite the side containing said door opening.

8. A passenger-carrying motor vehicle comprising a body; a frame; forwardly and rearwardly disposed wheel supported axles spaced respectively approximately equal distances from the front and rear ends of said body to provide a balanced body arrangement on the axles; springs connecting said axles to said frame; an internal combustion engine supported on the portion of said frame that projects forwardly of said forwardly disposed axle; a floor in said body substantially below the tops of the wheels and engine and above the wheel centers; a door opening in one side of said body; said engine being disposed laterally of the longitudinal center line of said vehicle on the side opposite said door opening to provide a comfortable passenger space adjacent one side of said engine; vehicle control mechanism and a driver's seat on the other side of said engine; and a depressed floor section in said body adjacent said door opening forming a step at a level at least as low as the wheel centers.

9. A passenger-carrying motor vehicle, comprising a frame; a forwardly disposed axle resiliently connected to said frame; steering wheels supporting said forwardly disposed axle; a rearwardly disposed differential drive axle resiliently connected to said frame having a centrally disposed differential mechanism; an internal combustion engine supported adjacent the forward end of said frame; a propeller shaft driven by said engine and driving said differential mechanism; a passenger-carrying body housing said engine and said axles and wheels having a floor level disposed below the tops of said wheels and engine and above the wheel centers; a door opening in one side of said body; said engine being disposed laterally of the longitudinal center line of said vehicle on the side opposite said door opening to provide a passenger space between said engine and the side of the body controlling said door opening; vehicle control mechanism and a driver's seat on the other side of said engine; and a depressed floor section in said body adjacent said door opening forming a step at least as low as the wheel centers.

10. A passenger-carrying motor vehicle comprising a frame; a forwardly disposed axle; steering wheels supporting said axle; a rearwardly disposed drive axle having a centrally disposed differential mechanism; springs connecting said axles to said frame in positions spaced approximately equal distances from the front and rear ends of said body to provide a balanced body arrangement on said axles; an internal combustion engine supported on the portion of said frame that projects forwardly of said forwardly disposed axle; a propeller shaft section driven by said engine; a frame supported bearing for said propeller shaft section disposed between said axles; a flexible and extensible propeller shaft section connecting said first mentioned propeller shaft section and said differential mechanism; a floor in said body substantially below the tops of the wheels and engine; a door opening in one side of said body; said engine being disposed laterally of the longitudinal center line of said vehicle on the side opposite said door opening; and vehicle control mechanism and a driver's seat on the other side of said engine.

11. A passenger-carrying motor vehicle comprising a frame; a forwardly disposed axle; steering wheels supporting said axle; a rearwardly disposed drive axle having a centrally disposed differential mechanism and differential housing; springs connecting said axles to said frame in positions approximately equally spaced from the front and rear ends of said body; an internal combustion engine supported on the portion of said frame that projects forwardly of said forwardly disposed axle; a propeller shaft section driven by said engine; a frame supported bearing for said propeller shaft section disposed between said axles; a flexible and extensible propeller shaft section connecting said first mentioned propeller shaft section and said differential mechanism; a floor in said body substantially below the tops of the wheels and engine and approximately at or slightly below the level of the top of said differential housing; a door opening in one side of said body; said engine being disposed laterally of the longitudinal center line of said vehicle toward the side opposite that containing said door opening; and vehicle control mechanism and a driver's seat on the other side of said engine.

12. A passenger-carrying motor vehicle, comprising a frame; a forwardly disposed axle resiliently connected to said frame; steering wheels supporting said forwardly disposed axle; a rearwardly disposed differential drive axle resiliently connected to said frame having a centrally disposed differential mechanism; an internal combustion engine supported adjacent the forward end of said frame; a propeller shaft section driven by said engine; a bearing for the rear end of said propeller shaft section supported on said frame intermediate said axles; a brake mechanism for said propeller shaft section supported on said frame; a flexible propeller shaft section connecting said first mentioned propeller shaft section and said differential mechanism; a passenger-carrying body housing said engine and wheels having a floor level disposed below the tops of said wheels and engine; housings extending above said floor level over said wheels and said engine; passenger seats disposed over said wheel housings; a door opening in one side of said body; said engine being disposed laterally of the longitudinal center line of said vehicle on the side opposite that containing said door opening to provide a passageway between said engine and said door opening; and vehicle control mechanism and a driver's seat on the other side of said engine.

13. A passenger-carrying motor vehicle, comprising a frame; a forwardly disposed axle resiliently connected to said frame; steering wheels supporting said forwardly disposed axle; a rearwardly disposed differential drive axle resiliently connected to said frame having a centrally disposed differential mechanism and differential housing; an internal combustion engine supported adjacent the forward end of said frame; a propeller shaft section driven by said engine; a bearing for the rear end of said propeller shaft section supported from said frame intermediate said axles; a brake mechanism for said propeller shaft section supported from said frame; a flexible propeller shaft section connecting said first mentioned propeller shaft section and said differential mechanism; a passenger-carrying body supported by said frame housing said engine and wheels having a floor level disposed below the tops of said wheels and engine and above said wheel centers; housings extending above said floor level over said wheels and engine; passenger seats disposed over said wheel housings; a door opening in one side of said body; said engine being disposed laterally of the longitudinal center line of said vehicle toward the side opposite that containing said door opening; and vehicle control mechanism and a driver's seat on the other side of said engine.

14. A passenger-carrying vehicle comprising a body of substantially uniform height from end to end and extending forwardly over the motor of the vehicle; said body being of sufficient width and proportionate extent over said motor to provide sufficient space at one side of the motor for the vehicle control mechanism and the operator of the vehicle, and to provide a comfortable space for passengers at the other side of said motor; an opening in one side of said body; an operator's seat and vehicle control mechanism disposed on the other side of said motor opposite said passenger space; and seats within the body to the rear of the motor arranged so that an aisle that extends lengthwise of the body substantially to one side of the longitudinal center of the body toward the side of the body containing the opening is provided between the seats.

15. A passenger-carrying vehicle comprising a body, an internal combustion engine disposed adjacent the forward end of said body and housed thereby, front and rear axles beneath said body, springs interconnecting said axles and body, said engine being positioned closely adjacent and over the front axle and having recess in the lower face of the casing thereof to permit the front axle to oscillate above the lower limits of the engine casing as the springs that connect said axle to the body bend when the vehicle moves over road irregularities.

In testimony whereof I affix my signature.

WILLIAM B. FAGEOL.